US012706520B2

(12) United States Patent
Nie et al.

(10) Patent No.: US 12,706,520 B2
(45) Date of Patent: Aug. 11, 2026

(54) ENERGY STORAGE INVERTER WITH THREE-STAGE TOPOLOGY STRUCTURE AND BUS BALANCE METHOD THEREOF, AND STORAGE MEDIUM

(71) Applicant: FranklinWH Energy Storage Inc., San Jose, CA (US)

(72) Inventors: Hongtao Nie, Shenzhen (CN); Song Chen, Shenzhen (CN); Xiaolong Luo, Shenzhen (CN); Bo Yang, Shenzhen (CN)

(73) Assignee: Franklin WH Energy Storage Inc., San Jose, CA (US)

( * ) Notice: Subject to any disclaimer, the term of this patent is extended or adjusted under 35 U.S.C. 154(b) by 226 days.

(21) Appl. No.: 18/617,343

(22) Filed: Mar. 26, 2024

(65) Prior Publication Data

US 2025/0309788 A1 Oct. 2, 2025

(51) Int. Cl.
*H02M 7/487* (2007.01)
*H02M 1/00* (2006.01)
*H02M 3/158* (2006.01)

(52) U.S. Cl.
CPC ........... *H02M 1/007* (2021.05); *H02M 7/487* (2013.01); *H02M 3/1582* (2013.01)

(58) Field of Classification Search
CPC ............................ H02M 1/007; H02M 1/0067
See application file for complete search history.

(56) References Cited

U.S. PATENT DOCUMENTS

2006/0226130 A1* 10/2006 Kooken .............. H02M 3/1584 219/130.1
2008/0067872 A1* 3/2008 Moth ...................... H02J 9/062 307/64
2025/0007389 A1* 1/2025 Chen ..................... H02M 7/487
2025/0202338 A1* 6/2025 Zhan ......................... H02J 3/28
2026/0025088 A1* 1/2026 Demirkutlu ........... H02M 7/483

* cited by examiner

*Primary Examiner* — Peter M Novak
(74) *Attorney, Agent, or Firm* — ANOVA LAW GROUP, PLLC

(57) ABSTRACT

The present disclosure provides an energy storage inverter, a bus balance method of the energy storage inverter, and a storage medium. The energy storage inverter includes a first stage of the energy storage inverter including a DC-DC conversion circuit, configured to convert a voltage of an energy storage battery into a DC voltage higher than the voltage of the energy storage battery; a second stage of the energy storage inverter including a three-level Boost circuit or a three-level Buck circuit configured to stabilize a bus voltage; and a third stage of the energy storage inverter including a three-level inversion circuit. The energy storage inverter includes a Boost operating mode 1, a Boost operating mode 2, a Boost operating mode 3, a Boost operating mode 4, a Buck operating mode 1, a Buck operating mode 2, a Buck operating mode 3 and a Buck operating mode 4.

20 Claims, 14 Drawing Sheets

ENERGY STORAGE INVERTER WITH THREE-STAGE TOPOLOGY STRUCTURE AND BUS BALANCE METHOD THEREOF, AND STORAGE MEDIUM

FIELD OF THE DISCLOSURE

The present disclosure generally relates to the field of energy storage technology and, more particularly, relates to an energy storage inverter with a three-stage topology structure, a bus balance method, and a storage medium.

BACKGROUND

In order to improve AC (alternating current) output performance of certain existing energy storage inverters, inverters adopt T-type or I-type three-level topology solutions. However, in a 120V/240V split-phase or single-phase power supply system, if a single-phase half wave load is used, positive and negative buses on the high-voltage DC (direct current) side of the inverter may be unbalanced.

SUMMARY

One aspect of the present disclosure provides an energy storage inverter with a three-stage topology structure. The energy storage inverter includes a first stage of the energy storage inverter including a DC-DC conversion circuit, configured to convert a voltage of an energy storage battery into a DC voltage higher than the voltage of the energy storage battery. The energy storage inverter further includes a second stage of the energy storage inverter including a three-level Boost circuit or a three-level Buck circuit configured to stabilize a bus voltage. The DC voltage higher than the voltage of the energy storage battery is configured as an DC input for the second stage of the energy storage inverter. The three-level Boost circuit includes a first inductor, a second inductor, a first power switch transistor, a second power switch transistor, a third power switch transistor, an fourth power switch transistor, a first capacitor and a second capacitor. The first inductor and the second inductor are on a right side of the first power switch transistor and the second power switch transistor. A terminal of the first inductor is electrically connected to the drain electrode of the first power switch transistor and the source electrode of the third power switch transistor. A terminal of the second inductor is electrically connected to the source electrode of the second power switch transistor and the drain electrode of the fourth power switch transistor. The source electrode of the first power switch transistor is electrically connected to the drain electrode of the second power switch transistor. The drain electrode of the third power switch transistor is electrically connected to one terminal of the first capacitor. The source electrode of the fourth power switch transistor is electrically connected to one terminal of the second capacitor. Another terminal of the first capacitor is electrically connected to another terminal of the second capacitor. The three-level Buck circuit includes a first inductor, a second inductor, a first power switch transistor, a second power switch transistor, a third power switch transistor, an fourth power switch transistor, a first capacitor and a second capacitor. The first inductor and the second inductor are on a left side of the first power switch transistor and the second power switch transistor. One terminal of the first inductor is electrically connected to the source electrode of the first power switch transistor and the drain electrode of the third power switch transistor. Another terminal of the first inductor is electrically connected to one terminal of the first capacitor. One terminal of the second inductor is electrically connected to the drain electrode of the second power switch transistor and the source electrode of the fourth power switch transistor. Another terminal of the second inductor is electrically connected to one terminal of the second capacitor. Another terminal of the first capacitor is electrically connected to another terminal of the second capacitor; and a source electrode of the third power switch transistor is electrically connected to a drain electrode of the fourth power switch transistor. The energy storage inverter further includes a third stage of the energy storage inverter including a three-level inversion circuit. The energy storage inverter includes a plurality of Boost operating modes and a plurality of Buck operating modes. The plurality of Boost operating modes includes a Boost operating mode 1, a Boost operating mode 2, a Boost operating mode 3 and a Boost operating mode 4; and the plurality of Buck operating modes includes a Buck operating mode 1, a Buck operating mode 2, a Buck operating mode 3 and a Buck operating mode 4.

Another aspect of the present disclosure provides a bus balance method of an energy storage inverter. The energy storage inverter with a single-phase half wave load includes a positive bus and a negative bus; and the energy storage inverter includes a plurality of Boost operating modes and a plurality of Buck operating modes, where the plurality of Boost operating modes includes a Boost operating mode 1, a Boost operating mode 2, a Boost operating mode 3 and a Boost operating mode 4; and the plurality of Buck operating modes includes a Buck operating mode 1, a Buck operating mode 2, a Buck operating mode 3 and a Buck operating mode 4. The bus balance method includes, under an off-grid discharge condition, when the single-phase half wave load is added at an output of the energy storage inverter and a three-level Boost circuit operates at the first Boost operating mode 1 or the Boost operating mode 2, determining a voltage of the positive bus and a voltage of the negative bus by a controller; if an absolute value of the voltage of the positive bus is less than an absolute value of the voltage of the negative bus, switching from the Boost operating mode 1 or the Boost operating mode 2 to the Boost operating mode 3 to increase the voltage of the positive bus, such that the voltage of the positive bus is balanced with the voltage of the negative bus; if the absolute value of the voltage of the positive bus is greater than the absolute value of the voltage of the negative bus, switching from the Boost operating mode 1 or the Boost operating mode 2 to the Boost operating mode 4 to increase the voltage of the negative bus, such that the voltage of the negative bus is balanced with the voltage of the positive bus; if the absolute value of the voltage of the positive bus is equal to the absolute value of the voltage of the negative bus, maintaining the Boost operating mode 1 or the Boost operating mode 2; and if a maximum value of the voltage of the positive bus or the voltage of the negative bus is greater than a highest threshold voltage, switching from the Boost operating mode 1 or the Boost operating mode 2 to the Buck operating mode 3 or the Buck operating mode 4 to release energy of the first capacitor or the second capacitor; and at this point, if a minimum value of the voltage of the positive bus or the voltage of the negative bus is less than a lowest threshold voltage, switching from the Buck operating mode 3 or the Buck operating mode 4 back to the Boost operating mode 3 or the Boost operating mode 4 to increase the voltage of the positive bus or the voltage of the negative bus.

Another aspect of the present disclosure provides a non-transitory computer-readable storage medium, containing program instructions for, when being executed by a processor, performing a bus balance method of an energy storage inverter. The energy storage inverter with a single-phase half wave load includes a positive bus and a negative bus; and the energy storage inverter includes a plurality of Boost operating modes and a plurality of Buck operating modes, where the plurality of Boost operating modes includes a Boost operating mode 1, a Boost operating mode 2, a Boost operating mode 3 and a Boost operating mode 4; and the plurality of Buck operating modes includes a Buck operating mode 1, a Buck operating mode 2, a Buck operating mode 3 and a Buck operating mode 4. The bus balance method includes, under an off-grid discharge condition, when the single-phase half wave load is added at an output of the energy storage inverter and a three-level Boost circuit operates at the first Boost operating mode 1 or the Boost operating mode 2, determining a voltage of the positive bus and a voltage of the negative bus by a controller; if an absolute value of the voltage of the positive bus is less than an absolute value of the voltage of the negative bus, switching from the Boost operating mode 1 or the Boost operating mode 2 to the Boost operating mode 3 to increase the voltage of the positive bus, such that the voltage of the positive bus is balanced with the voltage of the negative bus; if the absolute value of the voltage of the positive bus is greater than the absolute value of the voltage of the negative bus, switching from the Boost operating mode 1 or the Boost operating mode 2 to the Boost operating mode 4 to increase the voltage of the negative bus, such that the voltage of the negative bus is balanced with the voltage of the positive bus; if the absolute value of the voltage of the positive bus is equal to the absolute value of the voltage of the negative bus, maintaining the Boost operating mode 1 or the Boost operating mode 2; and if a maximum value of the voltage of the positive bus or the voltage of the negative bus is greater than a highest threshold voltage, switching from the Boost operating mode 1 or the Boost operating mode 2 to the Buck operating mode 3 or the Buck operating mode 4 to release energy of the first capacitor or the second capacitor; and at this point, if a minimum value of the voltage of the positive bus or the voltage of the negative bus is less than a lowest threshold voltage, switching from the Buck operating mode 3 or the Buck operating mode 4 back to the Boost operating mode 3 or the Boost operating mode 4 to increase the voltage of the positive bus or the voltage of the negative bus.

Other aspects of the present disclosure may be understood by those skilled in the art in light of the description, the claims, and the drawings of the present disclosure.

BRIEF DESCRIPTION OF THE DRAWINGS

The accompanying drawings, which are incorporated into a part of the specification, illustrate embodiments of the present disclosure and together with the description to explain the principles of the present disclosure.

DETAILED DESCRIPTION

References are made in detail to exemplary embodiments of the present disclosure, which are illustrated in accompanying drawings. Wherever possible, same reference numbers may be used throughout accompanying drawings to refer to same or similar parts.

In order to improve AC (alternating current) output performance of certain existing energy storage inverters, the inverters adopt T-type or I-type three-level topology solutions. However, in a 120V/240V split-phase or single-phase power supply system, if a single-phase half wave load (L1-to-N or L2-to-N, where L1 and L2 denote two output lines/wires, and N denotes a neutral line/wire) is used, positive and negative buses on the high-voltage DC (direct current) side of the inverter may be unbalanced. The term "unbalanced" herein refers to that the positive bus voltage is different from the negative bus voltage. That is, the voltages of the first capacitor C1 and the second capacitor C2 in following FIGS. 1-3 may not be equal to each other. The voltage distribution in households may be mainly split-phase, with two phases L1-N and L2-N each having a phase difference of 180 degrees. A half wave load is referred to the load with a current flowing through only positive half cycle or negative half cycle of AC. When the half wave load is only applied between L1-N or L2-N, such load is referred to a single-phase half wave load.

Figure 1:
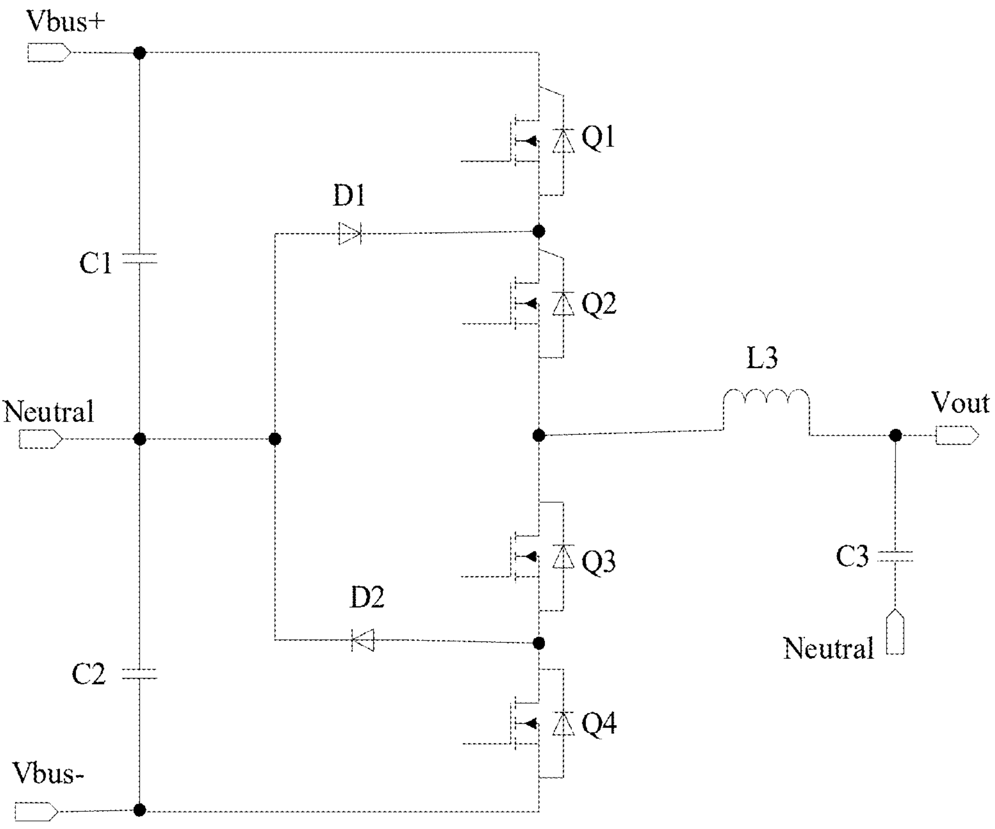
FIG. 1 depicts an exemplary I-type three-level inversion circuit.
Figure 2:
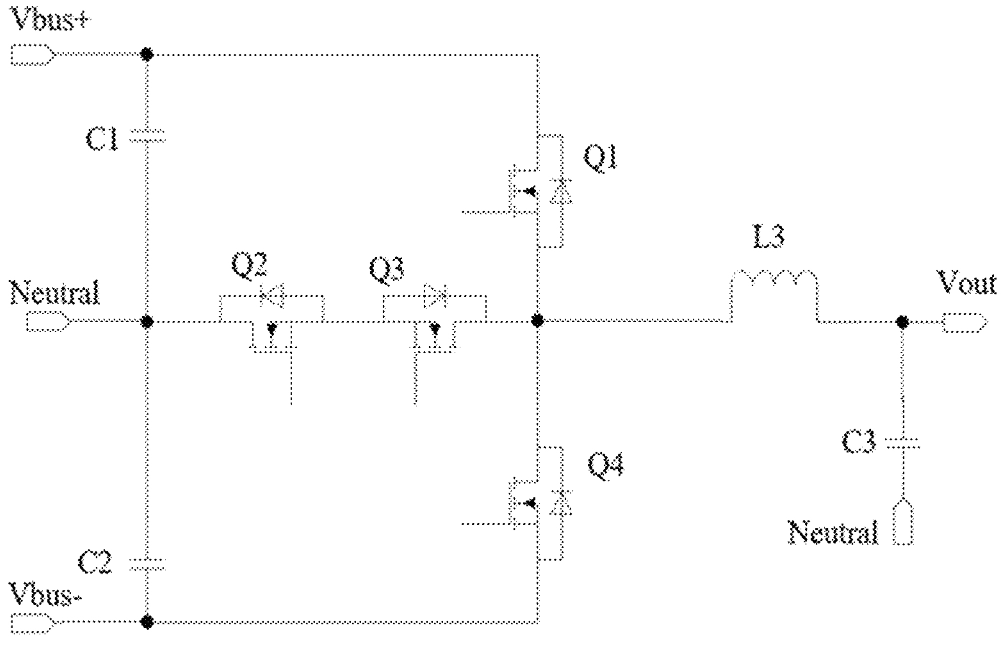
FIG. 2 depicts an exemplary T-type three-level inversion circuit.
Figure 3:
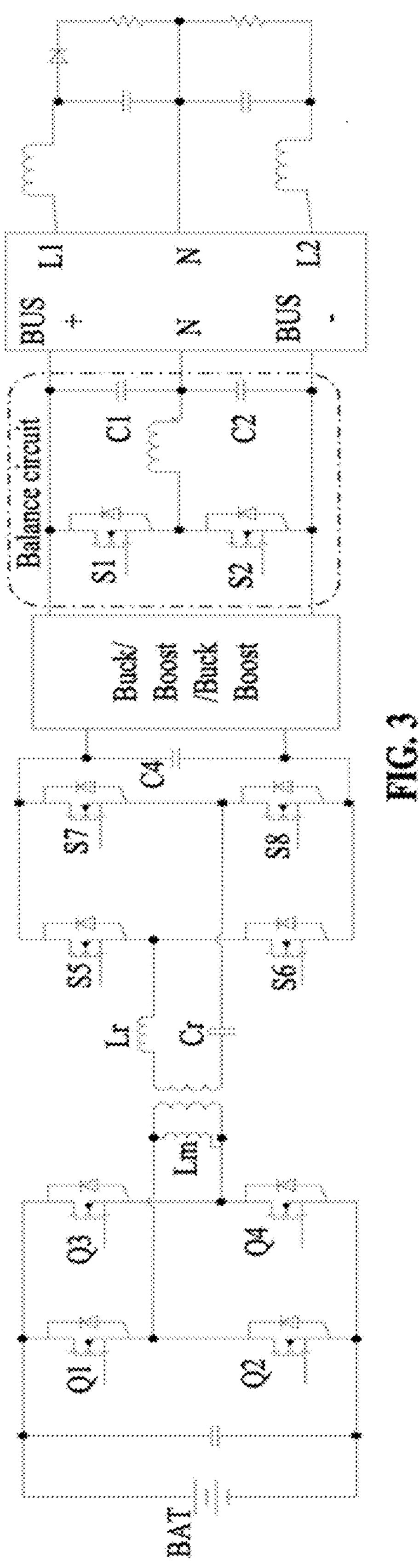
FIG. 3 depicts an exemplary energy storage inverter circuit with a balance circuit.

FIG. 1 depicts an exemplary I-type three-level inversion circuit; FIG. 2 depicts an exemplary T-type three-level inversion circuit; and FIG. 3 depicts an exemplary energy storage inverter circuit with a balance circuit. Referring to FIG. 1, the first capacitor C1 and the second capacitor C2 may be the positive bus (bus+) capacitor and the negative bus (bus−) capacitor of the I-type three-level inversion (DC input) respectively; the inversion circuit may include four main power transistors which are the first main power transistor Q1, the second main power transistor Q2, the third main power transistor Q3 and the fourth main power transistor Q4; the first diode D1 and the second diode D2 may respectively be the clamping diodes; and AC output may be implemented by controlling the driving of the first main power transistor Q1, the second main power transistor Q2, the third main power transistor Q3 and the fourth main power transistor Q4 to generate waves. The inversion circuit may further include the first inductor L3 and the third capacitor C3. Vbus+ indicates a positive bus voltage, and Vbus-indicates a negative bus voltage, Vout indicates an output voltage, and Neutral (N) denotes a neutral line or wire. Referring to FIG. 2, the first capacitor C1 and the second capacitor C2 may be the positive bus capacitor and the negative bus capacitor of the T-type three-level inversion (DC input) respectively; the inversion circuit may include four main power transistors which are the first main power transistor Q1, the second main power transistor Q2, the third main power transistor Q3 and the fourth main power transistor Q4; and AC output may be implemented by controlling the driving of the first main power transistor Q1, the second main power transistor Q2, the third main power transistor Q3 and the fourth main power transistor Q4 to generate waves. It should be noted that the I-type three-level inversion and the T-type three-level inversion have different arrangement manners of the first main power transistor Q1, the second main power transistor Q2, the third main power transistor Q3 and the fourth main power transistor Q4, which may not be limited in the present disclosure.

In order to solve above-mentioned problem, various inverters may implement a balance circuit with the positive and negative (DC) buses connected in parallel with each other, as shown in a black dotted line box in FIG. 3.

The balance circuit may mainly include a half bridge and inductors. When the positive and negative bus voltages are deviated to a certain value, the balance circuit may respond to the deviation. Taking FIG. 3 as an example, if the positive bus voltage VC1 (the voltage at two terminals of the first capacitor C1) is relatively large, the first power switch transistor S1 may work at high frequency, and the energy on the first capacitor C1 may be transferred to the negative bus capacitor, that is, the second capacitor C2, thereby realizing the balance of the positive and negative bus voltages; similarly, if the negative bus voltage VC2 (the voltage at two terminals of the second capacitor C2) is relatively large, the second power switch transistor S2 may work at high frequency, and the energy on the second capacitor C2 may be transferred to the positive bus capacitor, that is, the first capacitor C1. It should be noted that “BAT” in drawings of the present disclosure refers to abbreviation of the battery.

The main disadvantage of above-mentioned method is that an additional balance circuit is needed to balance the voltages of the positive and negative buses for the application scenario of outputting the single-phase half wave load, which may result in increased cost and space.

Figure 4:
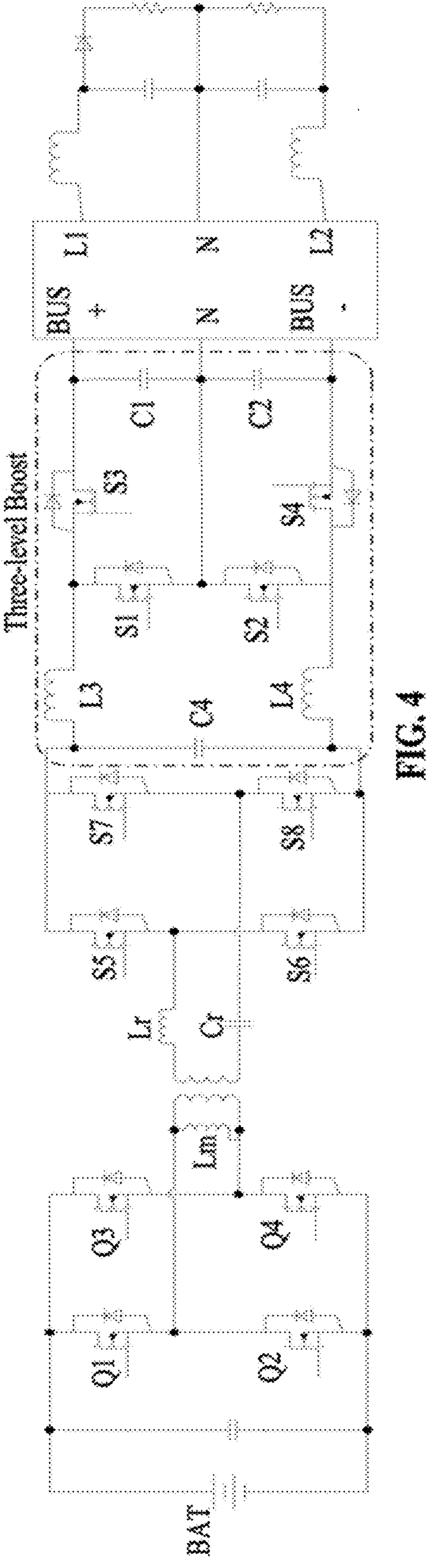
FIG. 4 depicts an exemplary energy storage inverter circuit that a second stage (intermediate stage) is a three-level Boost circuit according to various disclosed embodiments of the present disclosure.

According to various embodiments of the present disclosure, an energy storage inverter with a three-stage topology structure is described hereinafter. FIG. 4 depicts an exemplary energy storage inverter circuit that the second stage (intermediate stage) is the three-level Boost circuit according to various disclosed embodiments of the present disclosure.

Referring to FIG. 4, the energy storage inverter with the three-stage topology structure may include the first stage of the energy storage inverter including a DC-DC conversion circuit, configured to convert a voltage of an energy storage battery (i.e., BAT in FIG. 4) into a DC voltage higher than the voltage of the energy storage battery; and the second stage of the energy storage inverter including a three-level Boost circuit or a three-level Buck circuit configured to stabilize a bus voltage. The DC voltage higher than the voltage of the energy storage battery may be configured as an DC input for the second stage of the energy storage inverter.

The three-level Boost circuit may include the first inductor L3, the second inductor L4, the first power switch transistor S1, the second power switch transistor S2, the third power switch transistor S3, the fourth power switch transistor S4, the first capacitor C1, the second capacitor C2 and the fourth capacitor C4. The first inductor L3 and the second inductor L4 may be on a right side of the first power switch transistor S1 and the second power switch transistor S2. One terminal of the first inductor L3 may be electrically connected to each of a drain electrode of the first power switch transistor S1 and a source electrode of the third power switch transistor S3; one terminal of the second inductor L4 may be electrically connected to each of a source electrode of the second power switch transistor S2 and a drain electrode of the fourth power switch transistor S4; a source electrode of the first power switch transistor S1 may be electrically connected to a drain electrode of the second power switch transistor S2; a drain electrode of the third power switch transistor S3 may be electrically connected to one terminal of the first capacitor C1; a source electrode of the fourth power switch transistor S4 may be electrically connected to one terminal of the second capacitor C2; and another terminal of the first capacitor C1 may be electrically connected to another terminal of the second capacitor C2.

The three-level Buck circuit may include the first inductor L3, the second inductor L4, the first power switch transistor S1, the second power switch transistor S2, the third power switch transistor S3, the fourth power switch transistor S4, the first capacitor C1, the second capacitor C2 and the fourth capacitor C4. The first inductor L3 and the second inductor L4 may be on a left side of the first power switch transistor S1 and the second power switch transistor S2. One terminal of the first inductor L3 may be electrically connected to each of a source electrode of the first power switch transistor S1 and a drain electrode of the third power switch transistor S3, and another terminal of the first inductor L3 may be electrically connected to one terminal of the first capacitor C1; one terminal of the second inductor L4 may be electrically connected to each of a drain electrode of the second power switch transistor S2 and a source electrode of the fourth power switch transistor S4, and another terminal of the second inductor LA may be electrically connected to one terminal of the second capacitor C2; another terminal of the first capacitor C1 may be electrically connected to another terminal of the second capacitor C2; and a source electrode of the third power switch transistor S3 may be electrically connected to a drain electrode of the fourth power switch transistor S4.

The DC-DC conversion circuit may include the first main power transistor Q1, the second main power transistor Q2, the third main power transistor Q3, the fourth main power transistor Q4, the first power switch transistor S1, the second power switch transistor S2, the third power switch transistor S3, the fourth power switch transistor S4. The DC-DC conversion circuit may further include a resonant inductor Lr, an excitation inductor Lm and a resonant capacitor Cr, which may refer to corresponding description in the exiting technology for details.

The energy storage inverter may further include the third stage of the energy storage inverter including a three-level inversion circuit. In drawings of the present disclosure, L1 and L2 denote two output lines/wires, N denotes a neutral line/wire, BUS+ denotes the positive bus, BUS-denotes the negative bus, and BAT refers to abbreviation of the battery.

The energy storage inverter may include a Boost operating mode 1, a Boost operating mode 2, a Boost operating mode 3, a Boost operating mode 4, a Buck operating mode 1, a Buck operating mode 2, a Buck operating mode 3 and a Buck operating mode 4.

In one embodiment, the DC-DC conversion circuit is an LLC resonant conversion circuit, a DAB (dual active bridge) conversion circuit, a push-pull conversion circuit, or a phase-shifted full-bridge conversion circuit.

In one embodiment, at the three-level Boost circuit or the three-level Buck circuit, an output voltage of the first capacitor or the second capacitor is stabilized to a target bus voltage value by controlling turn-on and turn-off of the first power switch transistor, the second power switch transistor, the third power switch transistor and the fourth power switch transistor, where the target bus voltage is configured as a DC input of the third stage of the energy storage inverter.

In one embodiment, when a voltage of a positive bus and a voltage of a negative bus are unbalanced, operating modes are switched by controlling the first power switch transistor, the second power switch transistor, the third power switch transistor and the fourth power switch transistor to adjust the voltage of the positive bus and the voltage of the negative bus to be balanced with each other.

In one embodiment, bidirectional energy flow is implemented at each stage of the energy storage inverter.

In one embodiment, each power switch transistor is an MOSFET (metal-oxide-semiconductor field-effect transistor) or IGBT (insulated-gate bipolar transistor).

In one embodiment, the three-level inversion circuit is a T-type or I-type three-level inversion circuit, configured for implementing single-phase output or split-phase output.

In one embodiment, at the Boost operating mode 1, the first power switch transistor and the second power switch transistor are turned on to be in conduction, and the third power switch transistor and the fourth power switch transistor are turned off to be in disconnection.

In one embodiment, at the Boost operating mode 2, the first power switch transistor and the second power switch transistor are turned off to be in disconnection, and the third power switch transistor and the fourth power switch transistor are turned on to be in conduction.

In one embodiment, at the Boost operating mode 3, the first power switch transistor and the fourth power switch transistor are turned off to be in disconnection, and the second power switch transistor and the third power switch transistor are turned on to be in conduction.

In one embodiment, at the Boost operating mode 4, the first power switch transistor and the fourth power switch transistor are turned on to be in conduction, and the second power switch transistor and the third power switch transistor are turned off to be in disconnection.

In one embodiment, at the Buck operating mode 1, the third power switch transistor and the fourth power switch transistor are turned on to be in conduction, and the first power switch transistor and the second power switch transistor are turned off to be in disconnection.

In one embodiment, at the Buck operating mode 2, the third power switch transistor and the fourth power switch transistor are turned off to be in disconnection, and the first power switch transistor and the second power switch transistor are turned on to be in conduction.

In one embodiment, at the Buck operating mode 3, the second power switch transistor and the third power switch transistor are turned on to be in conduction, and the first power switch transistor and the fourth power switch transistor are turned off to be in disconnection.

In one embodiment, at the Buck operating mode 4, the first power switch transistor and the fourth power switch transistor are turned on to be in conduction, and the second power switch transistor and the third power switch transistor are turned off to be in disconnection.

Since the inverter is a T-type or I-type three-level inverter with an intermediate bus clamp, the intermediate (e.g., the second stage) Buck or Boost circuit may use the three-level solution (circuit). Referring to FIG. 4, the first inductor L3 and the second inductor L4 may be located on the left side of the first power switch transistor S1 and the second power switch transistor S2. Voltage boost (voltage step-up/increase) may be implemented from left to right, that is, $VC4<VC1+VC2$, where VC4 is the voltage of two terminals of the fourth capacitor C4, VC1 is the voltage of two terminals of the first capacitor C1, and VC2 is the voltage of two terminals of the second capacitor C2.

For the three-level Boost circuit, when the energy flows forward (from left to right), the three-level Boost circuit may operate in a Boost operating mode; and when the energy flows in reverse direction, the three-level Boost circuit may operate in a Buck operating mode.

Figure 5:
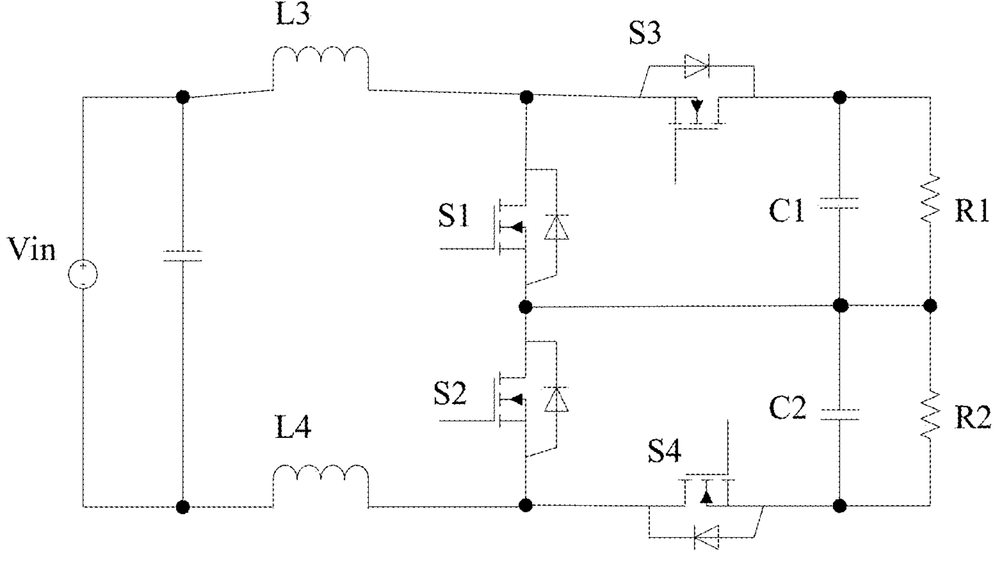
FIG. 5 depicts an exemplary three-level Boost circuit according to various disclosed embodiments of the present disclosure.

The output of the three-level Boost circuit may be configured for positive and negative buses. Corresponding to the neutral line N, the first capacitor C1 and the second capacitor C2 may be connected in series to form the positive and negative buses. In design calculation, the absolute values of the voltages of the positive and negative buses may be used. The three-level Boost circuit may be analyzed independently hereinafter. Referring to FIG. 5, Vin may be configured to represent the output voltage of a DC source of a previous stage; the fourth capacitor C4 may be an input capacitor; the first inductor L3 and the second inductor L4 may be Boost inductors; the first power switch transistor S1, the second power switch transistor S2, the third power switch transistor S3 and the fourth power switch transistor S4 may be main power switch transistors; the first capacitor C1 and the second capacitor C2 may be the positive bus capacitor and the negative bus capacitor respectively; and the first resistor R1 and the second resistor R2 may be configured to represent the loads on the positive and negative buses respectively.

In order to realize bi-directional energy flow in the energy storage system, the energy of the three-level Boost circuit may flow from left to right in the battery discharging mode, the three-level Boost circuit may be configured to operate at a Boost operating mode, and the first power switch transistor S1 and the second power switch transistor S2 may be mainly controlled to operate at this point; and the energy may flow reversely from right to left in the battery charging mode, the three-level Boost circuit may be configured to operate at a Buck operating mode, and the third power switch transistor S3 and the fourth power switch transistor S4 may be mainly controlled to operate at this point.

According to various embodiments of the present disclosure, detailed analysis of the Boost and Buck operating modes is described hereinafter.

VL3 is the voltage of two terminals of the first inductor L3, and VL4 is the voltage of two terminals of the second inductor L4; and VC1 is the voltage of two terminals of the first capacitor C1, and VC2 is the voltage of two terminals of the second capacitor C2.

Figure 6:
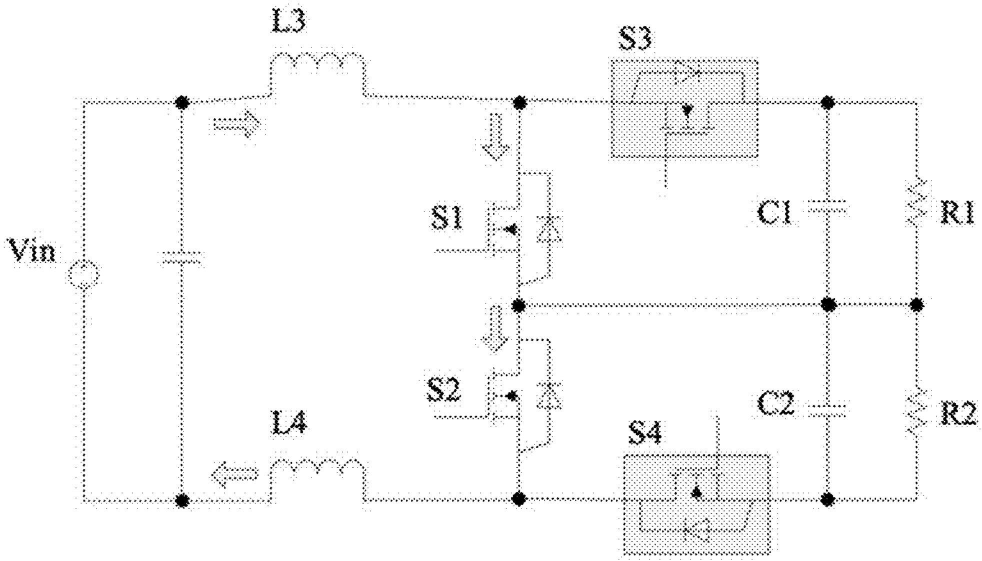
FIG. 6 depicts an exemplary Boost operating mode 1 according to various disclosed embodiments of the present disclosure.

FIG. 6 depicts an exemplary Boost operating mode 1 according to various disclosed embodiments of the present disclosure. Referring to FIG. 6, at the Boost operating mode 1, the first power switch transistor S1 and the second power switch transistor S2 may be turned on to be in conduction; the third power switch transistor S3 and the fourth power switch transistor S4 may be turned off to be in disconnection; VL3+VL4=Vin; the first inductor L3 and the second inductor L4 may store energy; and the current of the first inductor L3 or the second inductor L4 may increase.

It should be noted that, in the drawings of the present disclosure, a power switch transistor shown in a gray-color box indicates that such power switch transistor is turned off to be in disconnection. For example, referring to FIG. 6, the third power switch transistor S3 and the fourth power switch transistor S4 shown in gray-color boxes may be turned off to be in disconnection. In addition, arrows in FIGS. 6-16 indicate current flowing directions.

Figure 7:
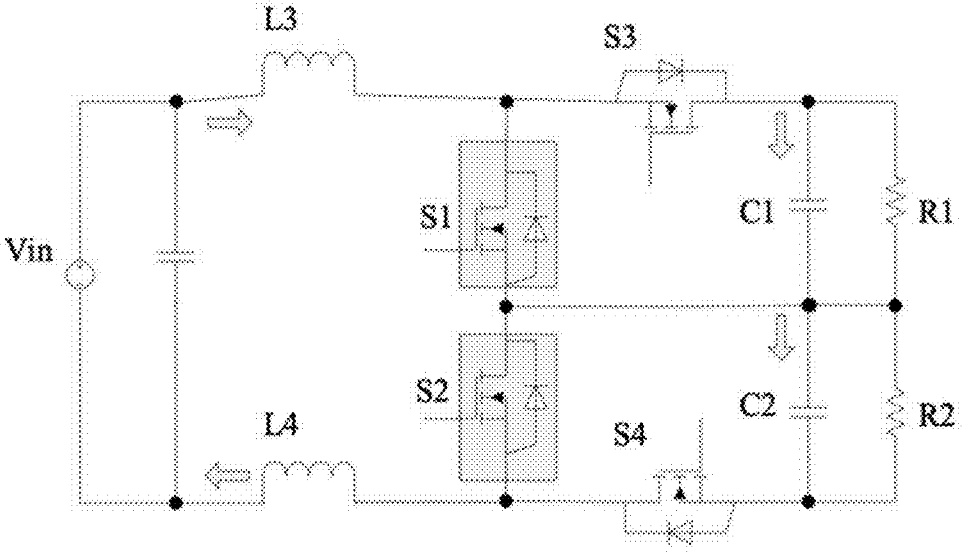
FIG. 7 depicts an exemplary Boost operating mode 2 according to various disclosed embodiments of the present disclosure.

FIG. 7 depicts an exemplary Boost operating mode 2 according to various disclosed embodiments of the present disclosure. Referring to FIG. 7, at the Boost operating mode 2, the first power switch transistor S1 and the second power switch transistor S2 may be turned off to be in disconnection; the third power switch transistor S3 and the fourth power switch transistor S4 are turned on to be in conduction; VL3+VL4=VC1+VC2−Vin; the first inductor L3 and the second inductor L4 may release energy; and the current may decrease. At this point, the positive and negative bus capacitors, that is, the first capacitor C1 and the second capacitor C2, may be charged simultaneously.

Figure 8:
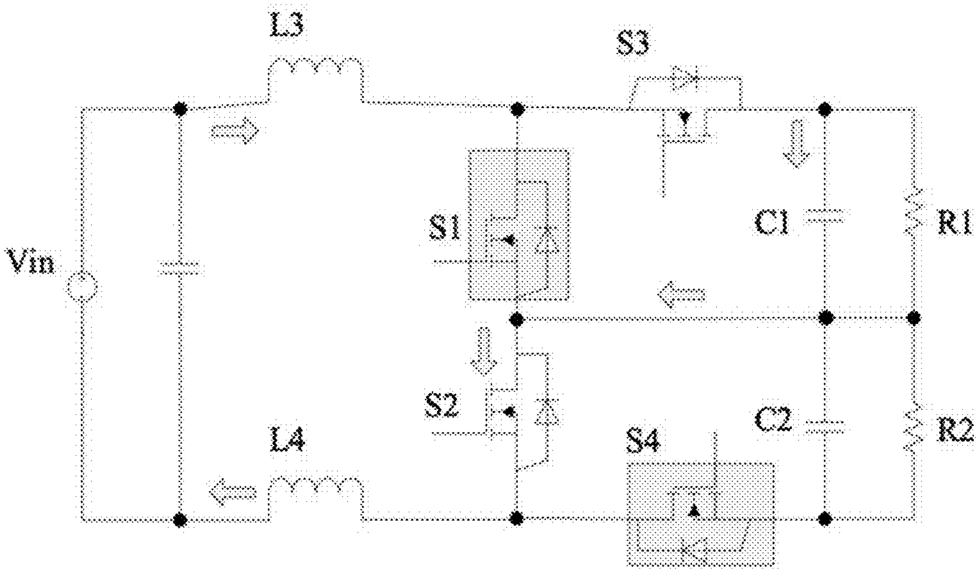
FIG. 8 depicts an exemplary Boost operating mode 3 according to various disclosed embodiments of the present disclosure.

FIG. 8 depicts an exemplary Boost operating mode 3 according to various disclosed embodiments of the present disclosure. Referring to FIG. 8, at the Boost operating mode 3, the first power switch transistor S1 and the fourth power switch transistor S4 may be turned off to be in disconnection; the second power switch transistor S2 and the third power switch transistor S3 may be turned on to be in conduction; VL3+VL4=Vin−VC1; the first inductor L3 and the second inductor L4 may store energy; and the current may increase. At this point, the positive bus capacitor, that is, the first capacitor C1, may only be charged.

Figure 9:
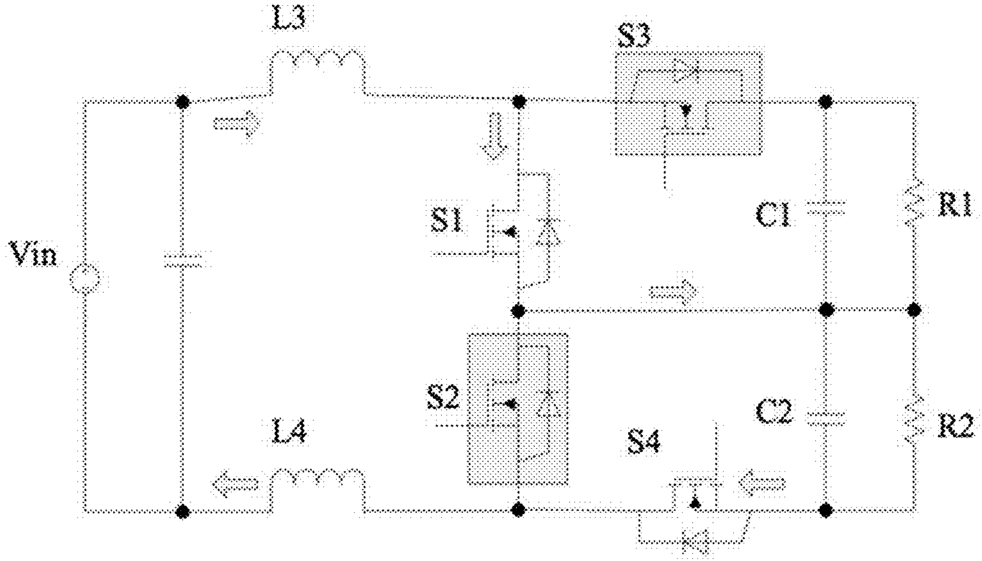
FIG. 9 depicts an exemplary Boost operating mode 4 according to various disclosed embodiments of the present disclosure.

FIG. 9 depicts an exemplary Boost operating mode 4 according to various disclosed embodiments of the present disclosure. Referring to FIG. 9, at the Boost operating mode 4, the first power switch transistor S1 and the fourth power switch transistor S4 may be turned on to be in conduction; the second power switch transistor S2 and the third power switch transistor S3 may be turned off to be in disconnection; VL3+VL4=Vin−VC2; the first inductor L3 and the second inductor L4 may store energy; and the current may increase. At this point, the negative bus capacitor, that is, the second capacitor C2, may only be charged.

Figure 10:
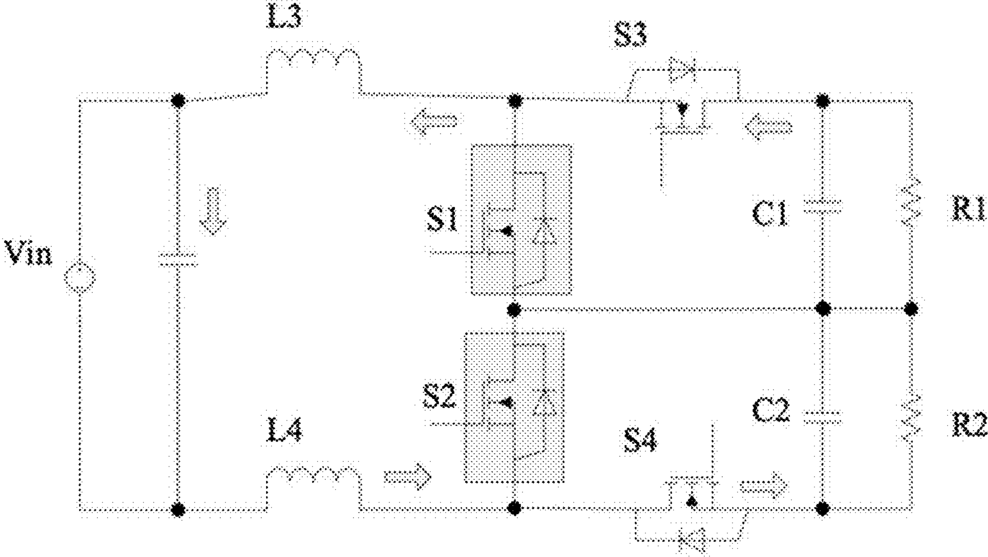
FIG. 10 depicts an exemplary Buck operating mode 1 according to various disclosed embodiments of the present disclosure.

FIG. 10 depicts an exemplary Buck operating mode 1 according to various disclosed embodiments of the present disclosure. Referring to FIG. 10, at the Buck operating mode 1, the third power switch transistor S3 and the fourth power switch transistor S4 may be turned on to be in conduction; the first power switch transistor S1 and the second power switch transistor S2 may be turned off to be in disconnection; VL3+VL4=VC1+VC2−Vin; the first inductor L3 and the second inductor L4 may store energy; the inductor current may increase in opposite direction; and the first capacitor C1 and the second capacitor C2 may discharge simultaneously.

Figure 11:
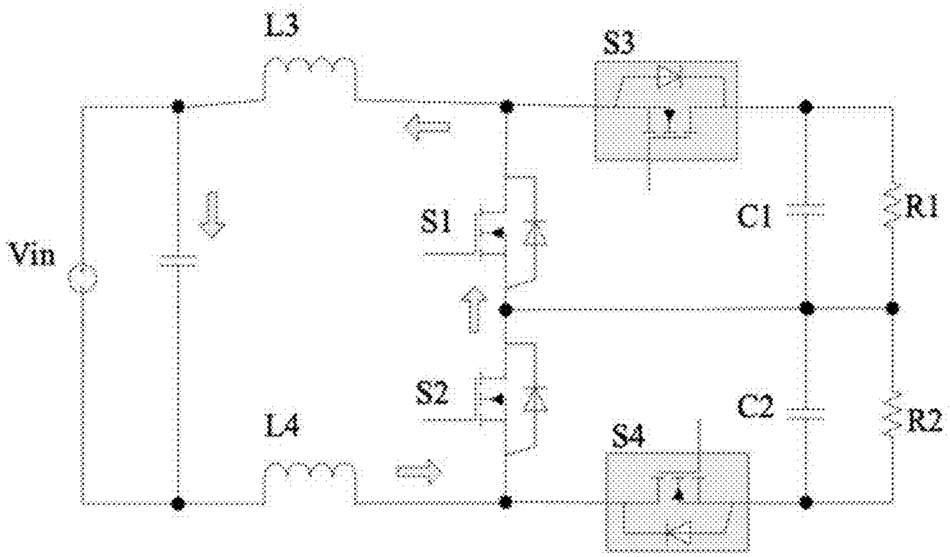
FIG. 11 depicts an exemplary Buck operating mode 2 according to various disclosed embodiments of the present disclosure.

FIG. 11 depicts an exemplary Buck operating mode 2 according to various disclosed embodiments of the present disclosure. Referring to FIG. 11, at the Buck operating mode 2, the third power switch transistor S3 and the fourth power switch transistor S4 may be turned off to be in disconnection; the first power switch transistor S1 and the second power switch transistor S2 may be turned on to be in conduction; VL3+VL4=Vin; the first inductor L3 and the second inductor L4 may discharge; and the inductor current may decrease.

Figure 12:
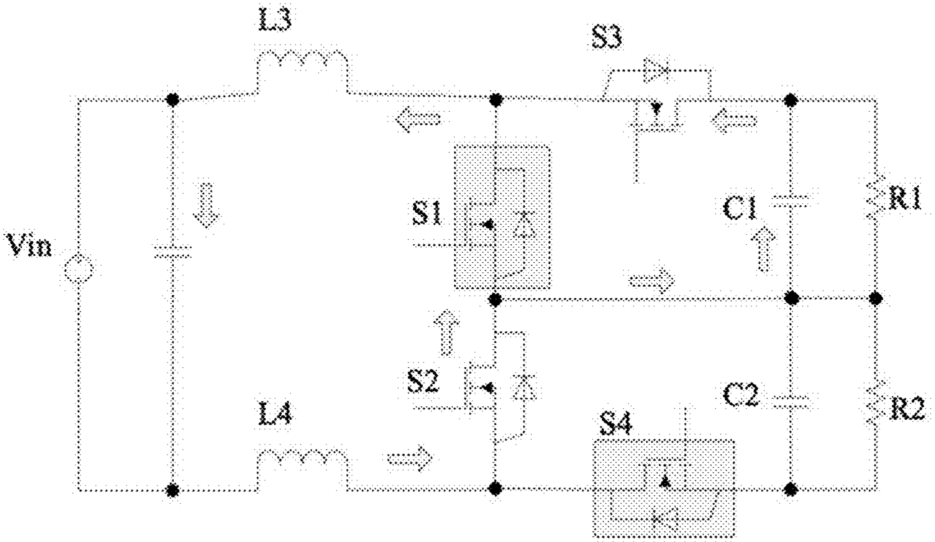
FIG. 12 depicts an exemplary Buck operating mode 3 according to various disclosed embodiments of the present disclosure.

FIG. 12 depicts an exemplary Buck operating mode 3 according to various disclosed embodiments of the present disclosure. Referring to FIG. 12, at the Buck operating mode 3, the second power switch transistor S2 and the third power switch transistor S3 may be turned on to be in conduction; the first power switch transistor S1 and the fourth power switch transistor S4 may be turned off to be in disconnection; VL3+VL4=Vin−VC1; the capacitor C1 may discharge through the first inductor L3 and the second inductor L4; and the inductor current may decrease.

Figure 13:
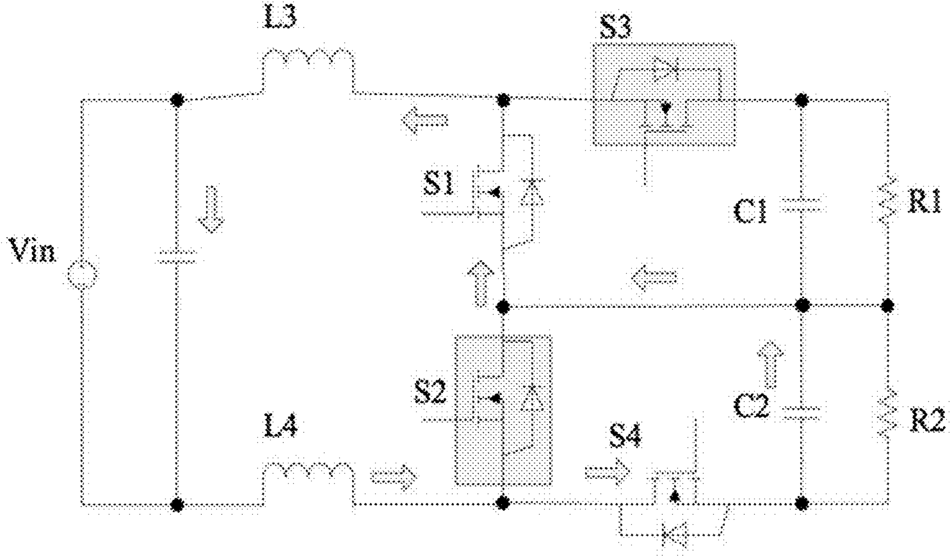
FIG. 13 depicts an exemplary Buck operating mode 4 according to various disclosed embodiments of the present disclosure.

FIG. 13 depicts an exemplary Buck operating mode 4 according to various disclosed embodiments of the present disclosure. Referring to FIG. 13, at the Buck operating mode 4, the first power switch transistor S1 and the fourth power switch transistor S4 may be turned on to be in conduction; the second power switch transistor S2 and the third power switch transistor S3 may be turned off to be in disconnection; VL3+VL4=Vin−VC2; the capacitor C2 may discharge through the first inductor L3 and the second inductor L4; and the inductor current may decrease.

It can be seen from the operating modes of above-mentioned second stage (e.g., intermediate) three-level Boost circuit that the voltages of the positive and negative buses may be adjusted respectively by controlling the power switch transistors to operate in different modes, thereby effectively adjusting the voltage difference between the positive and negative buses to implement the bus voltage balance.

Exemplarily, the three-level Boost circuit may switch from the Boost operating modes 1 and 2 to the Buck operating mode 3 or 4, and finally switch back to the Boost operating modes 1 and 2.

When the single-phase half wave load is added to AC output, it is equivalent to applying unbalanced load to the positive bus (two terminals of the first capacitor C1) or the negative bus (two terminals of the second capacitor C2) of the three-level Boost circuit (i.e., unit), which may result in deviation in the positive and negative bus capacitors. If the voltage difference is not adjusted through software control, the deviation may increase continuously, and a fault shutdown may be reported.

In order to effectively solve above-mentioned problem, the voltage of the positive bus Vbus+ at two terminals of the positive bus capacitor and the voltage of the negative bus Vbus− at two terminals of the negative bus capacitor may be sampled, where Vbus+=VC1, Vbus−=VC2, and Vbus=Vbus++Vbus−.

Under the off-grid discharge condition, when the single-phase half wave load is added to AC output and the three-level Boost circuit operates at a Boost operating mode (e.g., the first Boost operating mode 1 or the Boost operating mode 2), the positive bus voltage Vbus+ and the negative bus voltage Vbus− may be determined by a controller. If Vbus+<Vbus−, the Boost circuit may be switched from the first Boost operating mode 1 or the Boost operating mode 2 to the Boost operating mode 3 to increase the voltage of the positive bus Bus+, such that Vbus+ may be balanced with Vbus−. If Vbus+>Vbus−, the Boost circuit may be switched from the first Boost operating mode 1 or the Boost operating mode 2 to the Boost operating mode 4 to increase the voltage of the negative bus Bus−, such that Vbus− may be balanced with Vbus+. When the maximum value of the Vbus+ or Vbus− voltage is greater than Vth_H (the highest threshold voltage), the Boost operating mode may be switched to the Buck operating mode 3 or the Buck operating mode 4, and more energy of the positive bus capacitor or negative bus capacitor may be released to the battery side. At this point, if the minimum value of the Vbus+ or Vbus-voltage is less than Vth_L (the lowest threshold voltage), the Buck operating mode (e.g., the Buck operating mode 3 or the Buck operating mode 4) may be switched to the Boost operating mode (e.g., the first Boost operating mode 1 or the Boost operating mode 2) to increase the voltages of the positive and negative buses. Through determination of above-mentioned conditions and corresponding operating mode switching, when the single-phase half wave load is added to AC output, relative balance of the DC voltages of the positive and negative buses may be achieved without adding additional hardware such as the balance circuit. When the voltages of the positive and negative buses are balanced, the three-level Boost circuit (e.g., unit) may mainly operate in other operating modes, including the Boost operating modes 1 and 2, or the Buck operating modes 1 and 2, during the battery charging and discharging process.

In one embodiment, when the battery (i.e., BAT in drawings) is discharged normally, the second stage circuit may operate in a Boost operating mode. When the first power switch transistor S1 and the second power switch transistor S2 are both turned on to be in conduction, the circuit may operate in the Boost operating mode 1, then the first power switch transistor S1 and the second power switch transistor S2 are simultaneously turned off to be in disconnection, and the circuit may operate in the Boost operating mode 2. That is, the circuit may be switched between the Boost operating mode 1 and the Boost operating mode 2 to maintain the bus voltage. At this point, the AC output L1 may be suddenly added with a half wave load, causing the voltage on the positive bus C1 to be higher than the voltage on the negative bus C2. If the absolute value of the voltage of the positive bus is greater than the absolute value of Vth_H, in order to lower the voltage on the positive bus C1 capacitor, it is necessary to release as much energy as possible to the battery side. Therefore, the controller may control the second power switch transistor S2 and the third power switch transistor S3 to be in conduction simultaneously and enter the Buck operating mode 3.

Figure 14:
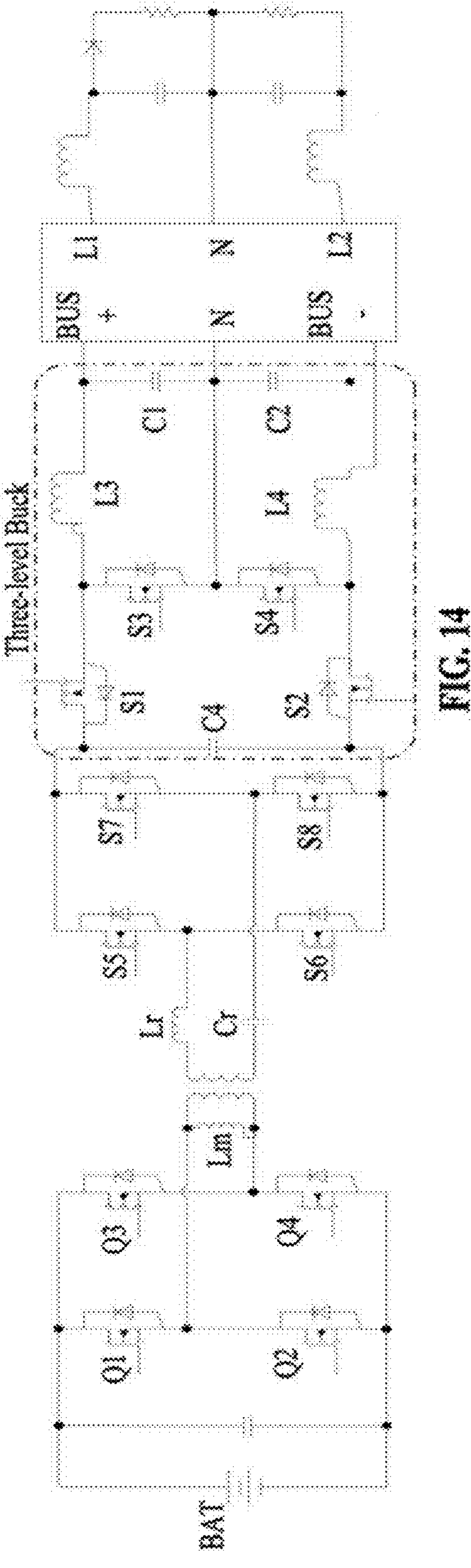
FIG. 14 depicts an exemplary energy storage inverter circuit that a second stage (intermediate stage) is a three-level Buck circuit according to various disclosed embodiments of the present disclosure.

Similarly, the three-level Buck circuit may be configured at the second stage (intermediate stage). FIG. 14 depicts an exemplary energy storage inverter circuit that the second stage (intermediate stage) is the three-level Buck circuit according to various disclosed embodiments of the present disclosure. The block diagram of the principle of the three-level Buck circuit is shown in FIG. 14. Different from the three-level Boost topology, the first inductor L3 and the second inductor L4 may be located on the right side of the first power switch transistor S1 and the second power switch transistor S2, and the voltage Buck (voltage step-down/decrease) may be implemented from left to right, that is, VC4>VC1+VC2, where VC4 is the voltage of two terminals of the fourth capacitor C4, VC1 is the voltage of two terminals of the first capacitor C1, and VC2 is the voltage of two terminals of the second capacitor C2.

The principle of balancing the output voltages on two terminals of each of the positive bus capacitor (the first capacitor C1) and the negative bus capacitor (the second capacitor C2) by the three-level Buck circuit may be similar to the principle of the three-level Boost circuit. By controlling the operating time sequences of the first power switch transistor S1, the second power switch transistor S2, the third power switch transistor S3 and the fourth power switch transistor S4, the three-level Buck circuit may operate at different operating modes. The operating modes of the three-level Buck circuit may be similar to the operating modes of the three-level Boost circuit. The balance of the voltages at two terminals of each of the positive bus capacitor (the first capacitor C1) and the negative bus capacitor (the second capacitor C2) may be implemented through mode switching.

Figure 15:
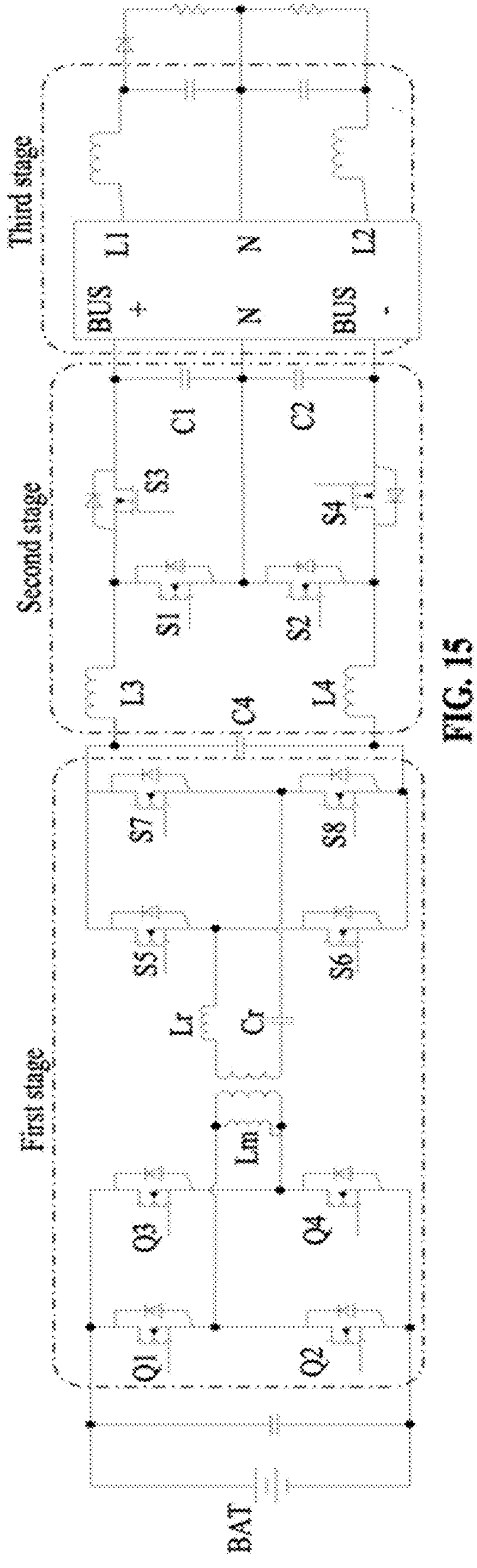
FIG. 15 depicts an exemplary energy storage inverter circuit that a second stage is a three-level Boost circuit, and a third stage is split-phase output according to various disclosed embodiments of the present disclosure.
Figure 16:
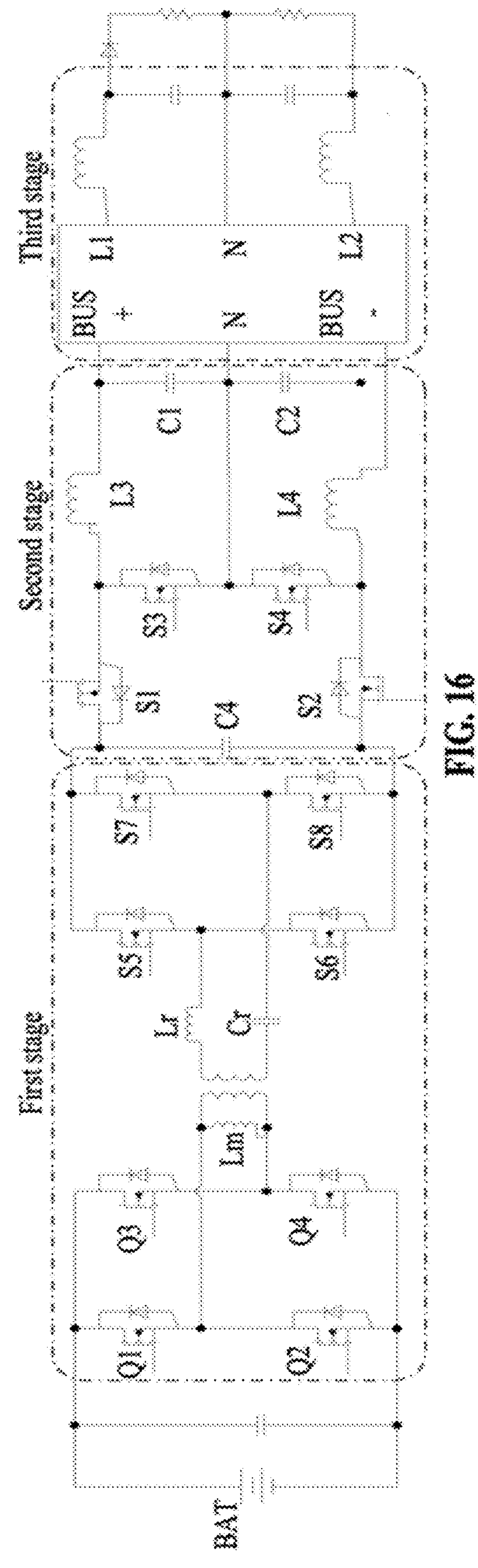
FIG. 16 depicts an exemplary energy storage inverter circuit that a second stage is a three-level Buck circuit, and a third stage is split-phase output according to various disclosed embodiments of the present disclosure.
Figure 17:
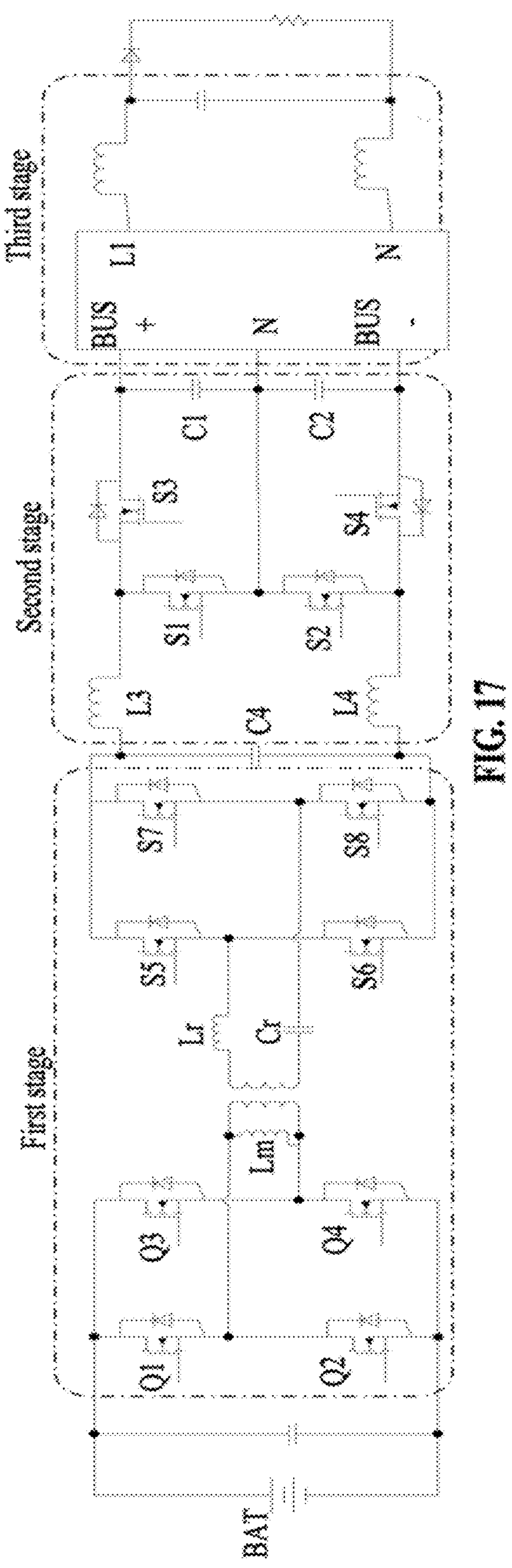
FIG. 17 depicts an exemplary energy storage inverter circuit that a second stage is a three-level Boost circuit, and a third stage is single-phase output according to various disclosed embodiments of the present disclosure.

FIG. 15 depicts an exemplary energy storage inverter circuit that the second stage is the three-level Boost circuit, and the third stage is split-phase output according to various disclosed embodiments of the present disclosure; FIG. 16 depicts an exemplary energy storage inverter circuit that the second stage is the three-level Buck circuit, and the third stage is split-phase output according to various disclosed embodiments of the present disclosure; and FIG. 17 depicts an exemplary energy storage inverter circuit that the second stage is the three-level Boost circuit, and the third stage is single-phase output according to various disclosed embodiments of the present disclosure. As shown in FIGS. 15-16, different exemplary energy storage inverter circuits are illustrated for various application scenarios, which may refer to above-mentioned embodiments for description and may not be described in detail herein.

For the inverter's AC split-phase output scenario, if the third stage (inversion side) adopts the three-level T or I topology solution, the second (e.g., intermediate) DC-DC stage may adopt the three-level Boost topology solution or three-level Buck topology solution, which may effectively solve the bus unbalance problem caused by the half wave load. That is, if the single-phase half wave load (L1-to-N or L2-to-N) is outputted, the balance of the voltages of the positive and negative buses may be implemented by controlling the operating modes of the second (intermediate) DC-DC stage without adding an extra balance (bridge) circuit.

Figure 18:
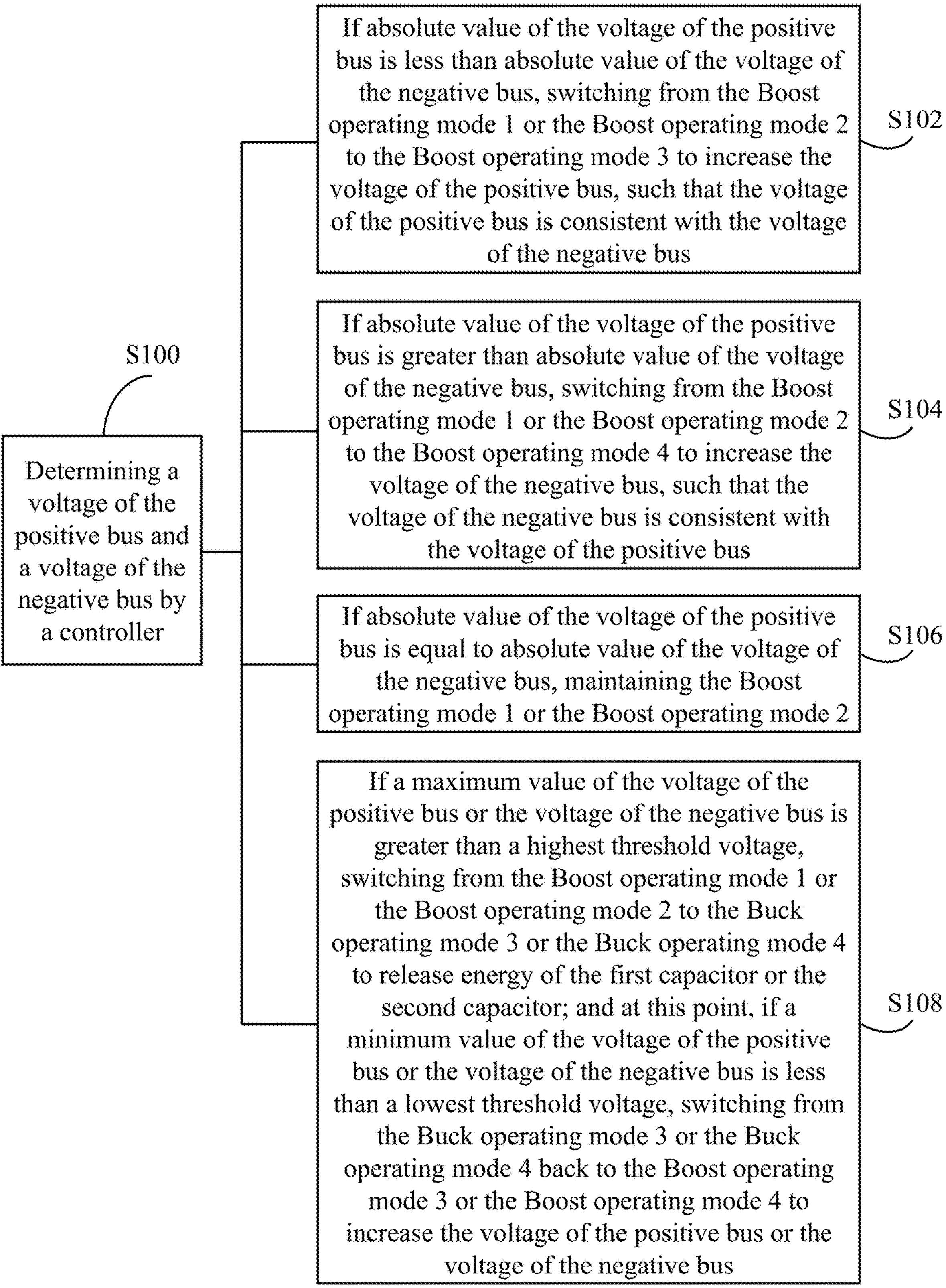
FIG. 18 depicts an exemplary bus balance method of an energy storage inverter according to various disclosed embodiments of the present disclosure.

Various embodiments of the present disclosure provide a bus balance method of the energy storage inverter. Referring to FIG. 18, FIG. 18 depicts an exemplary bus balance method of the energy storage inverter according to various disclosed embodiments of the present disclosure. The energy storage inverter with the single-phase half wave load includes the positive bus and the negative bus; and the energy storage inverter includes the plurality of Boost operating modes and the plurality of Buck operating modes, where the plurality of Boost operating modes includes the Boost operating mode 1, the Boost operating mode 2, the Boost operating mode 3 and the Boost operating mode 4; and the plurality of Buck operating modes includes the Buck operating mode 1, the Buck operating mode 2, the Buck operating mode 3 and the Buck operating mode 4. The bus balance method includes following exemplary steps. Under the off-grid discharge condition, the single-phase half wave load is added at an output of the energy storage inverter and the three-level Boost circuit operates at the first Boost operating mode 1 or the Boost operating mode 2. At S100, the voltage of the positive bus and the voltage of the negative bus by the controller are determined. At S102, if the absolute value of the voltage of the positive bus is less than the absolute value of the voltage of the negative bus, the Boost operating mode 1 or the Boost operating mode 2 is switched to the Boost operating mode 3 to increase the voltage of the positive bus, such that the voltage of the positive bus is balanced with the voltage of the negative bus. At S104, if the absolute value of the voltage of the positive bus is greater than the absolute value of the voltage of the negative bus, the Boost operating mode 1 or the Boost operating mode 2 is switched to the Boost operating mode 4 to increase the voltage of the negative bus, such that the voltage of the negative bus is balanced with the voltage of the positive bus. At S106, if the absolute value of the voltage of the positive bus is equal to the absolute value of the voltage of the negative bus, the Boost operating mode 1 or the Boost operating mode 2 is maintained. At S108, if the maximum value of the voltage of the positive bus or the voltage of the negative bus is greater than the highest threshold voltage, the Boost operating mode 1 or the Boost operating mode 2 is switched to the Buck operating mode 3 or the Buck operating mode 4 to release energy of the first capacitor or the second capacitor; and at this point, if the minimum value of the voltage of the positive bus or the voltage of the negative bus is less than a lowest threshold voltage, the Buck operating mode 3 or the Buck operating mode 4 is switched back to the Boost operating mode 3 or the Boost operating mode 4 to increase the voltage of the positive bus or the voltage of the negative bus.

Various embodiments of the present disclosure provide a non-transitory computer-readable storage medium, containing program instructions for, when being executed by a processor, performing a bus balance method of the energy storage inverter. The energy storage inverter with the single-phase half wave load includes the positive bus and the negative bus; and the energy storage inverter includes the plurality of Boost operating modes and the plurality of Buck operating modes, where the plurality of Boost operating modes includes the Boost operating mode 1, the Boost operating mode 2, the Boost operating mode 3 and the Boost operating mode 4; and the plurality of Buck operating modes includes the Buck operating mode 1, the Buck operating mode 2, the Buck operating mode 3 and the Buck operating mode 4. The bus balance method includes, under the off-grid discharge condition, when the single-phase half wave load is added at an output of the energy storage inverter and the three-level Boost circuit operates at the first Boost operating mode 1 or the Boost operating mode 2, determining the voltage of the positive bus and the voltage of the negative bus by the controller; if the absolute value of the voltage of the positive bus is less than the absolute value of the voltage of the negative bus, switching from the Boost operating mode 1 or the Boost operating mode 2 to the Boost operating mode 3 to increase the voltage of the positive bus, such that the voltage of the positive bus is balanced with the voltage of the negative bus; if the absolute value of the voltage of the positive bus is greater than the absolute value of the voltage of the negative bus, switching from the Boost operating mode 1 or the Boost operating mode 2 to the Boost operating mode 4 to increase the voltage of the negative bus, such that the voltage of the negative bus is balanced with the voltage of the positive bus; if the absolute value of the voltage of the positive bus is equal to the absolute value of the voltage of the negative bus, maintaining the Boost operating mode 1 or the Boost operating mode 2; and if the maximum value of the voltage of the positive bus or the voltage of the negative bus is greater than the highest threshold voltage, switching from the Boost operating mode 1 or the Boost operating mode 2 to the Buck operating mode 3 or the Buck operating mode 4 to release energy of the first capacitor or the second capacitor; and at this point, if the minimum value of the voltage of the positive bus or the voltage of the negative bus is less than a lowest threshold voltage, switching from the Buck operating mode 3 or the Buck operating mode 4 back to the Boost operating mode 3 or the Boost operating mode 4 to increase the voltage of the positive bus or the voltage of the negative bus.

From above-mentioned embodiments, it may be seen that at least following beneficial effects may be achieved in the present disclosure.

The second stage (DC-DC) has a relatively wide voltage adjustment range and may achieve high efficiency transmission. Without additionally adding the balance (bridge) circuit to the hardware, the voltages of the positive and negative buses may be balanced through software control, thereby reducing the cost and space of the system.

Although some embodiments of the present disclosure have been described in detail through various embodiments, those skilled in the art should understand that above embodiments may be for illustration only and may not be intended to limit the scope of the present disclosure. Those skilled in the art should understood that modifications may be made to above embodiments without departing from the scope and spirit of the present disclosure. The scope of the present disclosure may be defined by the appended claims.

What is claimed is:

1. An energy storage inverter with a three-stage topology structure, comprising:

a first stage of the energy storage inverter including a DC-DC conversion circuit, configured to convert a voltage of an energy storage battery into a DC voltage higher than the voltage of the energy storage battery;

a second stage of the energy storage inverter including a three-level Boost circuit or a three-level Buck circuit configured to stabilize a bus voltage, wherein:

the DC voltage higher than the voltage of the energy storage battery is configured as an DC input for the second stage of the energy storage inverter;

the three-level Boost circuit includes a first inductor, a second inductor, a first power switch transistor, a second power switch transistor, a third power switch transistor, an fourth power switch transistor, a first capacitor and a second capacitor, wherein the first inductor and the second inductor are on a right side of the first power switch transistor and the second power switch transistor; a terminal of the first inductor is electrically connected to the drain electrode of the first power switch transistor and the source electrode of the third power switch transistor; a terminal of the second inductor is electrically connected to the source electrode of the second power switch transistor and the drain electrode of the fourth power switch transistor; the source electrode of the first power switch transistor is electrically connected to the drain electrode of the second power switch transistor; the drain electrode of the third power switch transistor is electrically connected to one terminal of the first capacitor; the source electrode of the fourth power switch transistor is electrically connected to one terminal of the second capacitor; and another terminal of the first capacitor is electrically connected to another terminal of the second capacitor; or the three-level Buck circuit includes a first inductor, a second inductor, a first power switch transistor, a second power switch transistor, a third power switch transistor, an fourth power switch transistor, a first capacitor and a second capacitor, wherein the first inductor and the second inductor are on a left side of the first power switch transistor and the second power switch transistor; one terminal of the first inductor is electrically connected to the source electrode of the first power switch transistor and the drain electrode of the third power switch transistor, and another terminal of the first inductor is electrically connected to one terminal of the first capacitor; one terminal of the second inductor is electrically connected to the drain electrode of the second power switch transistor and the source electrode of the fourth power switch transistor, and another terminal of the second inductor is electrically connected to one terminal of the second capacitor; another terminal of the first capacitor is electrically connected to another terminal of the second capacitor; and the source electrode of the third power switch transistor is electrically connected to the drain electrode of the fourth power switch transistor; and a third stage of the energy storage inverter including a three-level inversion circuit, wherein:

the energy storage inverter includes a plurality of Boost operating modes and a plurality of Buck operating modes, wherein the plurality of Boost operating modes includes a Boost operating mode 1, a Boost operating mode 2, a Boost operating mode 3 and a Boost operating mode 4; and the plurality of Buck operating modes includes a Buck operating mode 1, a Buck operating mode 2, a Buck operating mode 3 and a Buck operating mode 4.

2. The energy storage inverter according to claim 1, wherein:

the DC-DC conversion circuit is an LLC resonant conversion circuit, a DAB (dual active bridge) conversion circuit, a push-pull conversion circuit, or a phase-shifted full-bridge conversion circuit.

3. The energy storage inverter according to claim 1, wherein:

at the three-level Boost circuit or the three-level Buck circuit, an output voltage of the first capacitor or the second capacitor is stabilized to a target bus voltage value by controlling turn-on and turn-off of the first power switch transistor, the second power switch transistor, the third power switch transistor and the fourth power switch transistor, wherein the target bus voltage is configured as a DC input of the third stage of the energy storage inverter.

4. The energy storage inverter according to claim 3, wherein:

when a voltage of a positive bus and a voltage of a negative bus are unbalanced, operating modes are switched by controlling the first power switch transistor, the second power switch transistor, the third power switch transistor and the fourth power switch transistor to adjust the voltage of the positive bus and the voltage of the negative bus to be balanced with each other.

5. The energy storage inverter according to claim 1, wherein:

bidirectional energy flow is implemented at each stage of the energy storage inverter.

6. The energy storage inverter according to claim 1, wherein:

each power switch transistor is an MOSFET (metal-oxide-semiconductor field-effect transistor) or IGBT (insulated-gate bipolar transistor).

7. The energy storage inverter according to claim 1, wherein:

the three-level inversion circuit is a T-type or I-type three-level inversion circuit, configured for implementing single-phase output or split-phase output.

8. The energy storage inverter according to claim 1, wherein:

at the Boost operating mode 1, the first power switch transistor and the second power switch transistor are turned on to be in conduction, and the third power switch transistor and the fourth power switch transistor are turned off to be in disconnection.

9. The energy storage inverter according to claim 1, wherein:

at the Boost operating mode 2, the first power switch transistor and the second power switch transistor are turned off to be in disconnection, and the third power switch transistor and the fourth power switch transistor are turned on to be in conduction.

10. The energy storage inverter according to claim 1, wherein:

at the Boost operating mode 3, the first power switch transistor and the fourth power switch transistor are turned off to be in disconnection, and the second power switch transistor and the third power switch transistor are turned on to be in conduction.

11. The energy storage inverter according to claim 1, wherein:

at the Boost operating mode 4, the first power switch transistor and the fourth power switch transistor are turned on to be in conduction, and the second power switch transistor and the third power switch transistor are turned off to be in disconnection.

12. The energy storage inverter according to claim 1, wherein:

at the Buck operating mode 1, the third power switch transistor and the fourth power switch transistor are turned on to be in conduction, and the first power switch transistor and the second power switch transistor are turned off to be in disconnection.

13. The energy storage inverter according to claim 1, wherein:

at the Buck operating mode 2, the third power switch transistor and the fourth power switch transistor are turned off to be in disconnection, and the first power switch transistor and the second power switch transistor are turned on to be in conduction.

14. The energy storage inverter according to claim 1, wherein:

at the Buck operating mode 3, the second power switch transistor and the third power switch transistor are turned on to be in conduction, and the first power switch transistor and the fourth power switch transistor are turned off to be in disconnection.

15. The energy storage inverter according to claim 1, wherein:

at the Buck operating mode 4, the first power switch transistor and the fourth power switch transistor are turned on to be in conduction, and the second power switch transistor and the third power switch transistor are turned off to be in disconnection.

16. A bus balance method of an energy storage inverter, wherein the energy storage inverter with a single-phase half wave load includes a positive bus and a negative bus; and the energy storage inverter includes a plurality of Boost operating modes and a plurality of Buck operating modes, wherein the plurality of Boost operating modes includes a Boost operating mode 1, a Boost operating mode 2, a Boost operating mode 3 and a Boost operating mode 4; and the plurality of Buck operating modes includes a Buck operating mode 1, a Buck operating mode 2, a Buck operating mode 3 and a Buck operating mode 4, the method comprising:

under an off-grid discharge condition, when the single-phase half wave load is added at an output of the energy storage inverter and a three-level Boost circuit operates at the first Boost operating mode 1 or the Boost operating mode 2:

determining a voltage of the positive bus and a voltage of the negative bus by a controller;

if an absolute value of the voltage of the positive bus is less than an absolute value of the voltage of the negative bus, switching from the Boost operating mode 1 or the Boost operating mode 2 to the Boost operating mode 3 to increase the voltage of the positive bus, such that the voltage of the positive bus is balanced with the voltage of the negative bus;

if the absolute value of the voltage of the positive bus is greater than the absolute value of the voltage of the negative bus, switching from the Boost operating mode 1 or the Boost operating mode 2 to the Boost operating mode 4 to increase the voltage of the negative bus, such that the voltage of the negative bus is balanced with the voltage of the positive bus;

if the absolute value of the voltage of the positive bus is equal to the absolute value of the voltage of the negative bus, maintaining the Boost operating mode 1 or the Boost operating mode 2; and if a maximum value of the voltage of the positive bus or the voltage of the negative bus is greater than a highest threshold voltage, switching from the Boost operating mode 1 or the Boost operating mode 2 to the Buck operating mode 3 or the Buck operating mode 4 to release energy of the first capacitor or the second capacitor; and at this point, if a minimum value of the voltage of the positive bus or the voltage of the negative bus is less than a lowest threshold voltage, switching from the Buck operating mode 3 or the Buck operating mode 4 back to the Boost operating mode 3 or the Boost operating mode 4 to increase the voltage of the positive bus or the voltage of the negative bus.

17. The method according to claim 16, wherein:

at the Boost operating mode 1, the first power switch transistor and the second power switch transistor are turned on to be in conduction, and the third power switch transistor and the fourth power switch transistor are turned off to be in disconnection;

at the Boost operating mode 2, the first power switch transistor and the second power switch transistor are turned off to be in disconnection, and the third power switch transistor and the fourth power switch transistor are turned on to be in conduction;

at the Boost operating mode 3, the first power switch transistor and the fourth power switch transistor are turned off to be in disconnection; and the second power switch transistor and the third power switch transistor are turned on to be in conduction; and at the Boost operating mode 4, the first power switch transistor and the fourth power switch transistor are turned on to be in conduction; and the second power switch transistor and the third power switch transistor are turned off to be in disconnection.

18. The method according to claim 16, wherein:

at the Buck operating mode 1, the third power switch transistor and the fourth power switch transistor are turned on to be in conduction, and the first power switch transistor and the second power switch transistor are turned off to be in disconnection;

at the Buck operating mode 2, the third power switch transistor and the fourth power switch transistor are turned off to be in disconnection, and the first power switch transistor and the second power switch transistor are turned on to be in conduction;

at the Buck operating mode 3, the second power switch transistor and the third power switch transistor are turned on to be in conduction, and the first power switch transistor and the fourth power switch transistor are turned off to be in disconnection; and at the Buck operating mode 4, the first power switch transistor and the fourth power switch transistor are turned on to be in conduction, and the second power switch transistor and the third power switch transistor are turned off to be in disconnection.

19. A non-transitory computer-readable storage medium, containing program instructions for, when being executed by a processor, performing a bus balance method of an energy storage inverter, wherein the energy storage inverter with a single-phase half wave load includes a positive bus and a negative bus; and the energy storage inverter includes a plurality of Boost operating modes and a plurality of Buck operating modes, wherein the plurality of Boost operating modes includes a Boost operating mode 1, a Boost operating mode 2, a Boost operating mode 3 and a Boost operating mode 4; and the plurality of Buck operating modes includes a Buck operating mode 1, a Buck operating mode 2, a Buck operating mode 3 and a Buck operating mode 4, the method comprising:

under an off-grid discharge condition, when the single-phase half wave load is added at an output of the energy storage inverter and a three-level Boost circuit operates at the first Boost operating mode 1 or the Boost operating mode 2:

determining a voltage of the positive bus and a voltage of the negative bus by a controller;

if an absolute value of the voltage of the positive bus is less than an absolute value of the voltage of the negative bus, switching from the Boost operating mode 1 or the Boost operating mode 2 to the Boost operating mode 3 to increase the voltage of the positive bus, such that the voltage of the positive bus is balanced with the voltage of the negative bus;

if the absolute value of the voltage of the positive bus is greater than the absolute value of the voltage of the negative bus, switching from the Boost operating mode 1 or the Boost operating mode 2 to the Boost operating mode 4 to increase the voltage of the negative bus, such that the voltage of the negative bus is balanced with the voltage of the positive bus;

if the absolute value of the voltage of the positive bus is equal to the absolute value of the voltage of the negative bus, maintaining the Boost operating mode 1 or the Boost operating mode 2; and if a maximum value of the voltage of the positive bus or the voltage of the negative bus is greater than a highest threshold voltage, switching from the Boost operating mode 1 or the Boost operating mode 2 to the Buck operating mode 3 or the Buck operating mode 4 to release energy of the first capacitor or the second capacitor; and at this point, if a minimum value of the voltage of the positive bus or the voltage of the negative bus is less than a lowest threshold voltage, switching back from the Buck operating mode 3 or the Buck operating mode 4 to the Boost operating mode 3 or the Boost operating mode 4 to increase the voltage of the positive bus or the voltage of the negative bus.

20. The storage medium according to claim 19, wherein:

at the Boost operating mode 1, the first power switch transistor and the second power switch transistor are turned on to be in conduction, and the third power switch transistor and the fourth power switch transistor are turned off to be in disconnection;

at the Boost operating mode 2, the first power switch transistor and the second power switch transistor are turned off to be in disconnection, and the third power switch transistor and the fourth power switch transistor are turned on to be in conduction;

at the Boost operating mode 3, the first power switch transistor and the fourth power switch transistor are turned off to be in disconnection; and the second power switch transistor and the third power switch transistor are turned on to be in conduction; and at the Boost operating mode 4, the first power switch transistor and the fourth power switch transistor are turned on to be in conduction; and the second power switch transistor and the third power switch transistor are turned off to be in disconnection.

* * * * *